E. V. POWERS AND W. J. BOYD.
AUTO ADJUSTABLE SUNSHADE.
APPLICATION FILED MAR. 7, 1921.

1,388,199.

Patented Aug. 23, 1921.

Inventors:
Earl V. Powers,
William J. Boyd.
By John C. Higdon
Attorney.

UNITED STATES PATENT OFFICE.

EARL V. POWERS AND WILLIAM J. BOYD, OF ST. LOUIS, MISSOURI.

AUTO ADJUSTABLE SUNSHADE.

1,388,199.  Specification of Letters Patent.  Patented Aug. 23, 1921.

Application filed March 7, 1921. Serial No. 450,161.

*To all whom it may concern:*

Be it known that we, EARL V. POWERS and WILLIAM J. BOYD, citizens of the United States, residing at St. Louis, in the State of Missouri, have invented certain new and useful Improvements in Auto Adjustable Sunshades, of which the following is a specification containing a full, clear, and exact description, reference being had to the accompanying drawings, forming a part hereof.

Our invention consists in the novel construction and combination of parts hereinafter particularly described and distinctly claimed.

The object of our invention is to provide an improved adjustable sun-shade and storm-shield for automobiles, which shall be supported entirely from the front end of the automobile top, free of the wind-shield; whereby a single size of our sun-shade will be easily applied to all widths of tops, irrespective of the dimensions of the windshield, or the distance between the windshield standards; and whereby our invention may be quickly adjusted to the most appropriate and efficient angle, to shield the eyes of the occupants of the automobile from the glaring lights, as well as against rain, snow, dust and other flying objects, and the glass of the windshield will be kept comparatively clear of obstruction.

A further object of our invention is to provide an automobile sun-shade of the character recited in the last paragraph, which shall be of low cost, simple, durable, and neat appearing.

Figure 1:
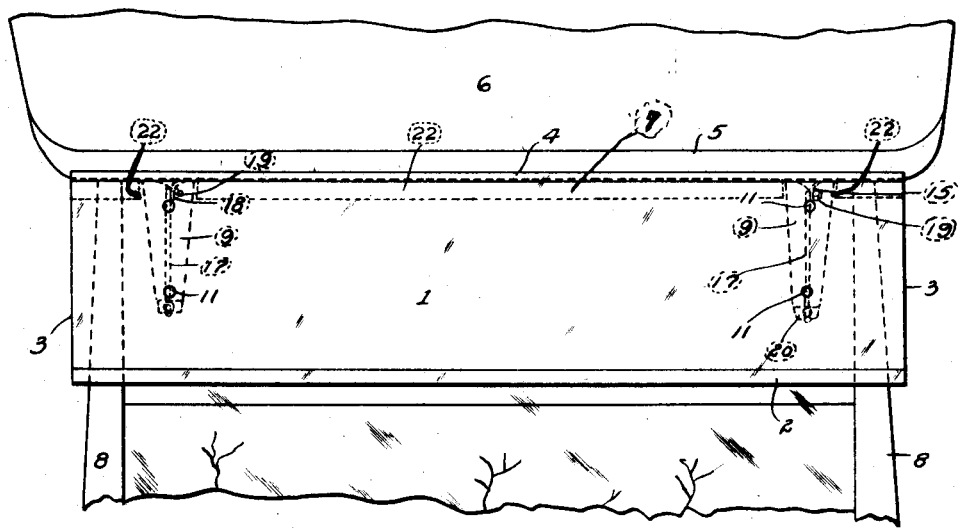
Figure 1 is a front elevation of parts of an automobile having our invention applied thereto.

Our invention is made preferably of a sheet of metal 1, of sufficient width and length, and provided with a vertical drip-flange 2 at its front edge, formed in the present case by bending said edge at about a right-angle and doubling it upon itself, thereby reinforcing said front edge, and making it strong enough to support the weight between the hinges and braces.

The opposite ends of the sheet-metal sunshade 1 are preferably doubled upon themselves, or seamed, as indicated by the numeral 3, to reinforce said ends.

The rear edge of said sheet 1 is provided with an upwardly extending rain-break or weather-strip 4, which extends at a right-angle to the sheet, and prevents the rain and snow from being blown into the joint between the sun-shade and the front horizontal bow or cross-bar 5 of the automobile top 6.

Figure 2:
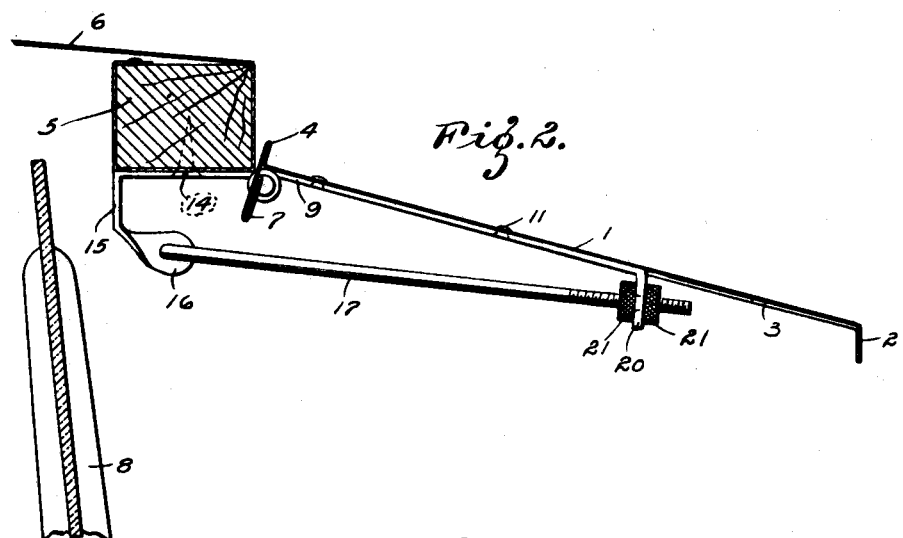
Fig. 2 is an enlarged detail transverse section of our sun-shade, and the parts of the automobile top to which it is secured.

Another portion of the rear edge of the sheet 1 extends downwardly from the said rain-break 4, and acts to reinforce said edge; and both rain-break 4 and the downwardly-extending flange 7 are. formed by doubling the metal on itself, as shown in Fig. 2.

The numeral 8 designates one of the side-standards of the automobile wind-shield.

The numeral 9 designates two hinges, the front leaves of which are provided with apertures 10 for the passage of rivets 11, in securing said leaves to the underside of the metal sheet 1.

The rear leaves of said hinges 9 are provided with perforations 12 through which common screws or other fastenings 14 are passed, in securing said rear leaves to the underside of the automobile top cross-bar 5.

Figure 3:
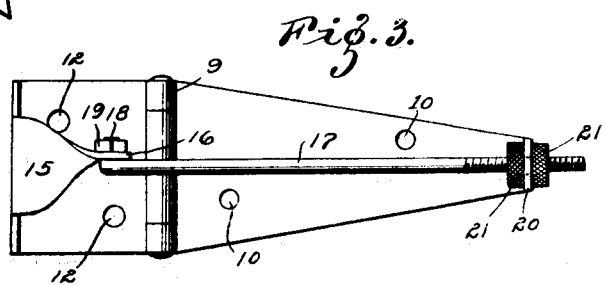
Fig. 3 is a detail plan-view of one of the hinges and its supporting adjustable brace, detached and inverted.

Projecting downwardly from the rear ends of the rear leaves of said hinges are brace-supporting arms or lugs 15 terminating in perforated ears 16 to which the rear ends of adjustable brace-rods 17 are pivotally attached by means of a stud 18 passing through said perforated ears and held in place by a nut 19 threaded on said stud, Fig. 3.

The front ends of said front leaves of said hinges are bent downwardly at about a right-angle, to form thereat perforated ears 20, through the perforations of which the front ends of said brace-rods 17 extend.

The said front ends of said brace-rods 17 are screw-threaded, and lock-nuts or clamping-nuts 21 are mounted thereon, with the said perforated ears between them, so that by turning the nuts on said rods the angle of the sun-shade may be readily changed, to suit the occupants of the automobile, and as required by the condition of the weather.

From the above description, it will be seen that our sun-shade has no connection with, and is not supported by, the wind-shield posts or standards 8, the top being the only support for our invention.

Such a construction makes the sun-shade entirely independent of the wind-shield, and permits us to employ a sun-shade that is much longer than the distance between the standards of the wind-shield; or vice versa, the sun-shade may be much shorter than said distance, as may be preferred.

We claim:

A sheet-metal sun-shade having hinges at its rear edge, by means of which it is to be supported entirely by the attachment of said hinges to the front bow or cross-bar of an automobile top; perforated brace-arms projecting downwardly from the rear of said hinges; perforated ears at the front ends of said hinges; brace-rods pivoted at their rear ends to the said perforated brace-arms and having their forward ends screw-threaded and mounted in the perforations of said perforated ears; and nuts on said threaded portions of said braces, on each side of said perforated ears.

In testimony whereof we have signed our names to this specification in presence of two subscribing witnesses.

EARL V. POWERS.
WILLIAM J. BOYD.

Witnesses:
JOHN C. HIGDON,
HENRY L. HIGDON.